INVENTOR:
JAN CORNELISSEN
BY:
HIS ATTORNEY

United States Patent Office 3,348,690
Patented Oct. 24, 1967

3,348,690
CATCHER FOR CLEANING WATER SURFACES
Jan Cornelissen, The Hague, Netherlands, assignor to Shell Oil Company, New York, N.Y., a corporation of Delaware
Filed Nov. 9, 1964, Ser. No. 409,824
Claims priority, application Netherlands, Nov. 14, 1963, 300,508
8 Claims. (Cl. 210—242)

ABSTRACT OF THE DISCLOSURE

An oil skimming apparatus for removing oil films from the surface of large bodies of water comprises a floating vessel having two elongated booms that are pivotally secured at one end thereof to opposite sides of the vessel hull. The booms float longitudinally on the water surface and are secured in a forwardly and outwardly divergent position with respect to the vessel axis of movement. As the vessel moves, the booms are swept over the water surface, thereby funneling the oil film within the sweep of the booms axially therealong to the juncture between the booms and the hull. At the said juncture, vortex producing inlets are provided in the vessel hull for the oil to flow into and then to be conducted to an oil-water separating tank within the vessel.

---

This invention relates to a vessel for collecting matter, such as oil, floating on water, and in particular for cleaning the surface of water in harbors, waterways and the like.

The vessel according to the invention is primarily intended for the removal of oil from the surface of the water, as is necessary in harbors, where, as a result of heavy shipping traffic and the frequent discharge of oil-containing water, serious water pollution problems occur. The vessel is also very suitable for lending assistance in the case of accidents where oil is spilled on the surface of the water; such as oil tanker collisions, etc. Also in bays and in the open seat the vessel may make a contribution in the abatement of water pollution and it is very useful in abating the fouling of beaches and in contributing to the protection of marine fauna.

Vessels of this type are known and generally contain a suitable catcher which may or may not form part of the vessel. Such vessels also have one or more separating tanks and one or more discharge lines for separated water and/or for the impurities. In many cases these vessels are provided with one or more pumps and they may also be provided with an independent propulsion device. In addition, a certain number of such vessels are provided with means which simultaneously restrict the movement of the water in the vicinity of the catcher and drive the impurities floating on the water to the said catcher.

The impurities floating on the surface of the water may, for example, be water-immiscible liquids like oil having a lower specific gravity than water, or finely-divided solids, for example, powdery material, or small pieces of wood or the like. Since the most frequently occuring impurity on the surface of the water in harbors and waterways consists of a layer of oil floating on the said surface, the impurities will, for the sake of simplicity, be referred to generically as oil, in the following description.

During the "skimming" of the surface of the water by vessels intended for this purpose, the aim will of course be to collect a maximum quantity of impurities, while entraining as small a quantity of water as possible. If the oil is present in very thin layers, it is almost impossible to avoid the handling of considerable quantities of water by the catcher. An additional disadvantage is that during the catching operation emulsification occurs or is at any rate promoted as a result of pumping. The drawback of such a situation is that the separation process in the separating tanks does not take place quickly, so that either large-capacity tanks become necessary or, if this is not possible, operations must either be interrupted in order to achieve a satisfactory separation, or a less efficient separation and, consequently a less efficient cleaning of the surface of the water is all that can be obtained.

One of the objects of the invention is to provide a vessel which is suitable for removing layers of impurities of varying degrees of thickness from the water surface and which also obviates the above mentioned drawbacks.

Broadly, the invention relates to a vessel of the type mentioned in the preamble, comprising the combination of a pair of catching booms partly submerged in the water, e.g., floating on the surface of the water, which form a forwardly divergent angle with each other during forward movement of the vessel and each of which has one end attached to the vessel. The vessel contains one or more separating tanks in the hold thereof, which tanks have inlet means situated at the juncture of said booms with the vessel and are arranged to produce a vortex whereby the impurities are concentrated before entry into the tank(s). The tanks have means for the discharge of the admitted materials advantageously arranged to permit separate discharge of the separated impurities and water.

The above-mentioned combination makes it possible for impurities floating on the surface of the water to be driven in the direction of the vortex inlet by the catching booms, the thickness of the layer gradually increasing as a result of the fact that the said catching booms form an angle with each other. As a result of the said construction, a rotating movement of the layer is also caused at the locus of the vortex inlet, as a result of which intensive mixing of the floating layer with the water is avoided. Hence, if a layer of oil is present on the surface of the water, the force created at the vortex inlet permits the lighter oil to collect in the center of the vortex inlet and centrifugal force flings the heavier water outward toward the periphery of the vortex inlet through which a part of the water escapes. Thus, the vortex inlet helps achieve the desired result of collecting a maximum quantity of floating impurities while entraining as small a quantity of water as possible. During the cleaning process the vessel is moving, so that there is an increase in the thickness of the layer of oil or the like in the direction of the vortex inlet.

The vortex inlet issues near the bottom of the inlet compartment of the separating tank(s) where the oil core is broken up into a form which can easily be separated by gravity. From the separating tank(s) and likewise near the bottom, oil-free water is pumped back to the water outside the vessel until the oil-layer in the separating tank(s) has attained its maximum thickness. This oil can subsequently be discharged by means of the same pump.

A very suitable embodiment of the catching booms according to the invention is one in which each of the catching booms consists of a floating body which can be walked on and is hingeably secured to the hull of the vessel in such a way that the size of the angle between the two floating bodies is adjustable.

Such a construction is particularly suitable for vessels which are provided with their own propulsion device and in which case the catching booms may, for example, be secured to the side of the hull near the stern of the ship, and can also be releasably or movably connected to the hull, so that the vessel can easily proceed to the locus where the cleaning process is to be carried out with the booms contiguous with the sides of the vessel. It should be noted that the vessel according to the invention need not be provided with its own propulsion mechanism, but may be towed.

Further, the catching booms may be provided with a liquid line having, at its free end, a hydrant for a movable nozzle by means of which the floating layer may be driven within reach of the catching booms.

The advantage of this latter movable nozzle feature is that even in the case of hingeably secured wooden catching booms which of course should be rigid, less accessible harbor corners or the like may nevertheless be reached for purposes of cleaning. The liquid line leading to the nozzles on the catching booms may be connected to the delivery line of the pump which discharges the water from the separating tank(s) out to the said nozzles.

According to the invention the vortex inlet may consist of a vertical pipe, provided with an adjustable lateral opening near the surface of the water. The adjustability of this opening may be attained by providing the vortex pipe with a bushing which is movable relative to the said pipe and is likewise provided with a lateral opening. The height of water flow over the edge of the inflow opening of the vortex pipe may in this case be adjustable by vertical displacement of the bushing; the width of the inflow opening being adjustable by rotation of the bushing relative to the pipe.

The advantage of such an arrangement is that the size of the opening, as regards both the height and the width, may be adapted to the quantity and the viscosity of the impurities floating on the surface of the water, i.e., it is possible to adjust the size in such a way that, for every case which arises, a minimum quantity of water is caught with the impurities.

According to the invention the openings in both the pipe and the bushing are arranged in such a way that a tangential supply of the mixture is formed. This makes it at all times possible to set up a rotary movement in the vortex inlet, as a result of which the formation of the above-mentioned floating layer with a minimum inflow of water is attained.

The inlet compartment of the vessel is preferably separated from the separating tank(s) by a trash rack for retaining coarse dirt and other debris. Such a rack may, for example, consist of a wooden trellis, which can at any rate prevent pieces of driftwood or other large solid substances, from being sucked up by the pump, since the latter might lead to difficulties in the form of clogging or the like in the lines, valves and pump. A wire mesh or perforated plate may also be provided for this trash collecting purpose.

The separating tank(s) is preferably closed at the top in such a way that a gas or air cap is present above the surface of the liquid, which cap may be brought into communication with the atmosphere by means of a valved vent.

This is particularly advantageous in that the liquid level in the separating tank(s) may by this arrangement be kept at a certain height, so that the difference in level from the outside water level, necessary for a continuous flow in the vortex inlet, is insured by controlling the level in the separating tank.

The separating tank is provided with means for the separate discharge of the lower specific gravity floating layer of oil and the heavier water. This means may consist of a movable discharge pipe, provided with a suction nozzle which is situated on or near the bottom of the tank during the discharge of the water phase, and in another higher position during the discharge of the oil.

The discharge pipe is, therefore, preferably connected to a discharge pump present on board the vessel, the discharge side of this pump communicating with a line, which, through valves, may on the one hand be connected to the liquid lines of the catching booms and, on the other hand, to a delivery line, which issues near the water line behind the catching booms, seen in the direction of movement of the vessel.

The invention will now be described with reference to the accompanying drawings wherein.

Figure 1:
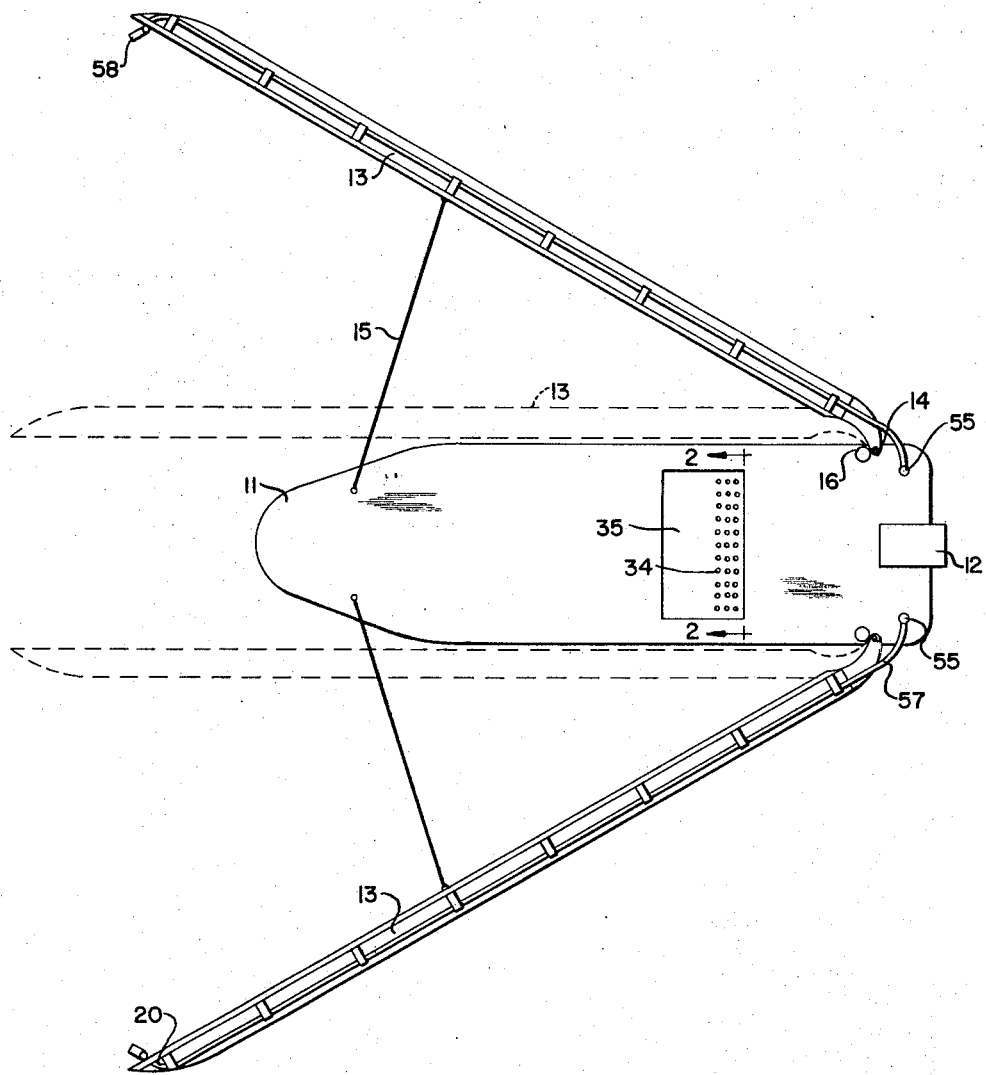
FIGURE 1 is a plan view of the vessel according to the invention.
Figure 4:
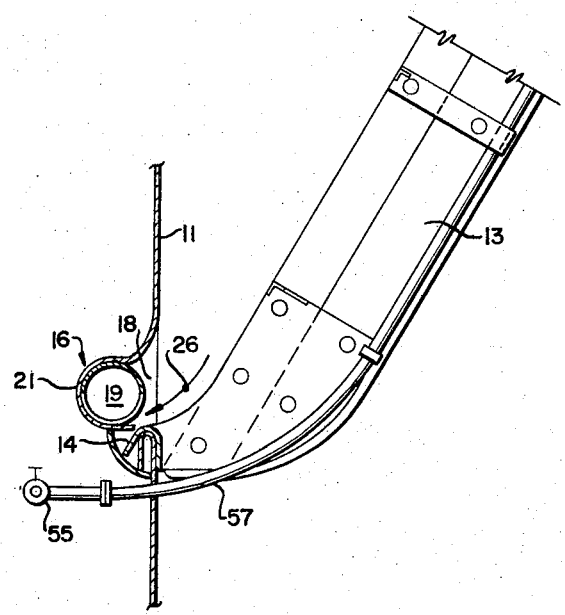
FIGURE 4 is an enlarged plan view partially in section showing in detail the juncture of a catching boom with the vessel.

As shown in the drawings, the vessel 11 is provided with propulsion means diagrammatically indicated at 12 and includes a screw 12a. The vessel may be driven by a diesel engine or other suitable means (not shown in the drawings). As best shown in FIGURES 1 and 4, a pair of elongated catching booms 13 are connected to the sides of the vessel 11, e.g., near the stern. Preferably, the catching booms 13 are connected to the side of the vessel 11 by means of a hinged joint 14 (see FIGURE 4). The angle between the two catching booms 13 is adjustable by changing the length of the cables or chains 15, and thus when the vessel 11 is proceeding to and from job locations, the catching booms 13 may be drawn into a closed position along side the vessel as shown by the dotted lines in FIGURE 1. This of course reduces the resistance to movement or drag on the vessel, so that it can move relatively quickly when it is not cleaning water.

It is to be noted that the catching booms 13 are quite large in order that personnel from the vessel may walk out upon them if necessary. The booms 13 are preferably constructed of large wooden beams or hollow metal pontoon sections which float in water; this avoids complications at the hinged connection 14. As shown, inlet means 16 are mounted on the vessel 11 and located immediately adjacent the juncture of the catching booms 13 with the hull of the vessel 11.

Figure 5:
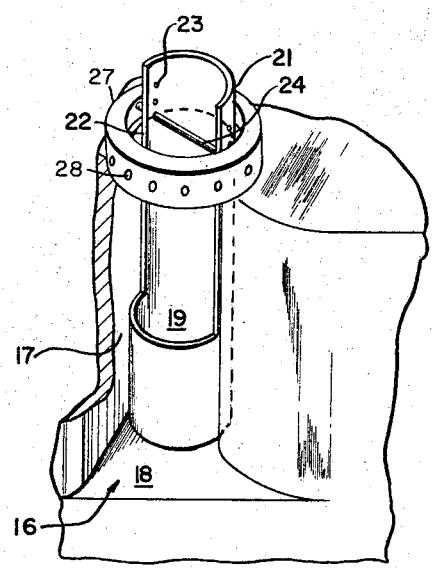
FIGURE 5 is an enlarged isometric view of a vortex inlet opening in accordance with the invention.

As shown in FIGURE 5, each inlet means 16 comprises a vortex chamber or recess 17 formed in the side of the vessel 11. The chamber 17 terminates at its bottom in a shelf 18 which is located near the normal water line of the vessel 11. The shelf 18 houses a rotatably and vertically movable tubular bushing member 21 which defines an inlet opening 19. The bushing 21 has a cut-away portion 22 at its upper end, which is provided with a series of diametrically opposite holes 23 spaced longitudinally of the portion 22 for receiving a supporting rod or bar member 24. To secure the bushing 21 vertically and rotatively in position relative to the vortex chamber 17, the supporting rod 24 also passes through diametrically opposite apertures 28 in a collar 27 that is secured to the vessel hull 11 around the bushing 21. With this arrangement it is possible for an operator on the vessel 11 to determine the level at which liquid will be admitted into the inlet opening 19 over the rim of the cut-away portion 22 of the bushing 21. Additionally, the operator may adjust the size of the inlet opening 19 by merely rotating the bushing 21.

Referring back to FIGURE 4, the bushing 21 is shown in half-closed position, as a result of which a floating layer of oil, etc., must enter the inlet means 16 in the direction of arrow 26 so that the tangential inflow caused by the location of the catching booms 13 with relation to the inlet means 16 sets up a strong rotation within said inlet means. This rotation, which is clockwise as viewed in FIGURE 4, will also occur when the bushing 21 is positioned so that the inlet opening 19 is fully open, according to the familiar "whirlpool" principle.

Figure 2:
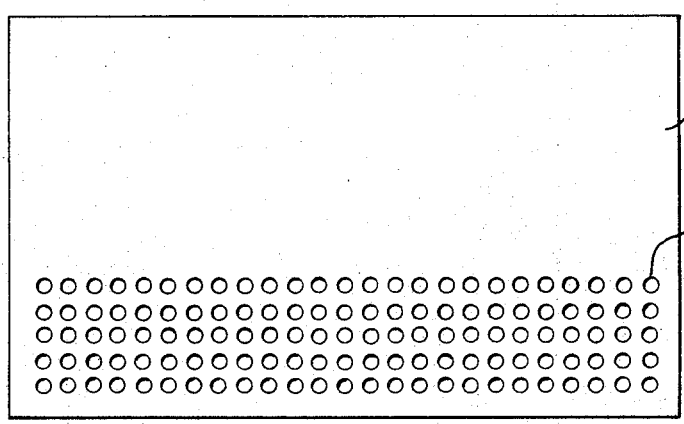
FIGURE 2 is a cross-sectional view taken on the line 2—2 of FIGURE 1.
Figure 3:
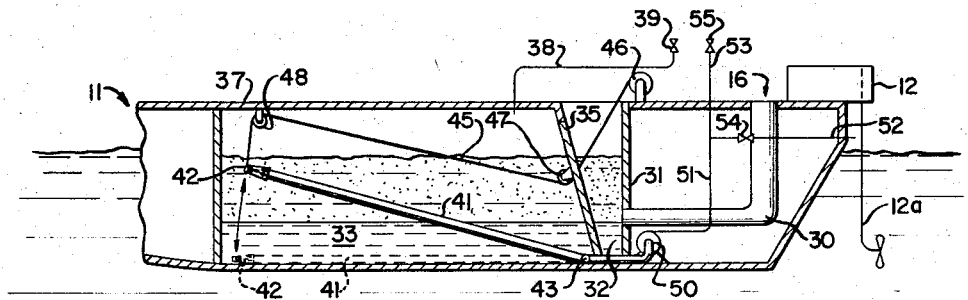
FIGURE 3 is a schematic diagram partially in longitudinal section, showing the general arrangement of apparatus in a vessel in accordance with the invention.

As shown in FIGURE 3, a channel or pipe 30 establishes fluid communication between each inlet means 16 and the vertically extending partition 31 which defines one side of an inlet compartment 32. The inlet compartment 32 communicates with a separating tank 33 via perforations 34 disposed in a band-shaped portion of a wall member 35 (FIGURE 2). The wall member 35 serves as a trash rack or debris collector for catching coarse materials and permitting principally liquid to pass through the perforations 34.

The separating tank 33 is covered by means of an airtight cap 37, said cap having a vent line 38 which may be closed by operating the valve 39. It is to be understood that the valve 39 may be conveniently placed in the wheel house normally located atop the vessel and thus the height of the liquid level in the separating tank 33 may be controlled by an operator in the wheel house.

In FIGURE 3, the upper layer of liquid in the separating tank 33 represents the lighter oil while the lower layer is the heavier water. The separating tank 33 is provided with a discharge pipe 41 having a suction nozzle 42. As shown, the discharge pipe 41 is mounted for rotation in the vertical plane at the swivel connection 43. A cable 45 leads from a winch 46 through pulleys 47 and 48 and is connected near the nozzle end of the suction pipe 41. Operation of the winch 46 enables either water or separated impurities, for instance oil, to be discharged from the separating tank 33 depending upon the position occupied by the discharge pipe 41. Thus, if the discharge pipe 41 is in its highest position, as shown by the full lines in FIGURE 3, only the light-weight liquid (such as oil) floating on the top is discharged. On the other hand, when the discharge pipe 41 is in the lowest position shown in dotted lines in FIGURE 3, only the heavier water is discharged. The discharge pipe 41 is connected through the swivel joint 43 with a suction pump 50. The pump 50 may be operated from the power source which propels the vessel.

A delivery line 51 leads away from the pump 50 and terminates in branch lines 52 and 53 which are provided with closure valves 54 and 55, respectively. The branch line 52 issues at the stern of the vessel close to the surface of the water and is normally used for the discharge of separated impurities (generally oil) or water from the separating tank 33, depending upon the position of the vertically adjustable pipe 41. When the branch line 52 is used to discharge separated impurities, such as oil, an extension hose may be connected to the end of line 52 and the impurities may be collected in a barge or on-shore tank. In certain instances however, water is discharged through the branch line 53. As shown in FIGURES 1 and 4, branch line 53 has two outlets, each communicating through respective valves 55 with flexible conduits 57 which run along the top of respective booms 13 to adjustable nozzles 58 located at the remote end of each of said booms. Through the nozzles 58 water jets may be played upon the water surface to drive floating oil and the like out of inaccessible harbor corners into a position where it can be caught between the booms 13.

I claim as my invention:
1. Apparatus for collecting matter floating on the surface of a liquid comprising:
   (a) a floating vessel;
   (b) elongated boom means partly submerged in the liquid and attached at one end thereof to the vessel and extending forwardly and outwardly from the direction of movement of the vessel for forming a collecting area between a portion of the vessel and said boom means;
   (c) a separating tank within said vessel; and,
   (d) inlet means for said separating tank disposed on the hull of said vessel near the juncture of said boom means therewith, said inlet means comprising a vortex chamber having an inlet opening to admit liquid and floating matter from said collecting area with a vortical motion, said inlet opening comprising a vertically extending tubular bushing member adjustably mounted in said vortex chamber for controlling the area of said opening.
2. Apparatus as set forth in claim 1 wherein said bushing member has a generally semi-circular cut-away portion near the top thereof and wherein said bushing member is rotatably mounted in said vortex chamber to thereby control the lateral size of said inlet opening.
3. Apparatus as set forth in claim 2 wherein a debris collecting means is positioned between said separating tank and said inlet means.
4. Apparatus as set forth in claim 3 wherein said debris collector comprises a perforated wall member.
5. Apparatus as set forth in claim 4 wherein said separating tank comprises a cap member having means adapted to keep the contents of said separating tank under fluid pressure.
6. Apparatus as set forth in claim 4 wherein said separating tank is provided with a discharge conduit having a vertically adjustable inlet opening.
7. Apparatus as set forth in claim 6 wherein:
   (a) the outlet end of said discharge conduit communicates with a pump;
   (b) a movable nozzle means is mounted on the end of said boom means remote from said vessel; and,
   (c) a fluid conducting means extends from the outlet side of said pump to said nozzle means.
8. Apparatus as set forth in claim 7 further comprising a second fluid conducting means for selectively communicating the outlet side of said pump with a fluid outlet positioned near the stern of said vessel.

References Cited

UNITED STATES PATENTS 61,880   2/1867   Serrell _____ 210—242

FOREIGN PATENTS 931,594   7/1963   Great Britain.

REUBEN FRIEDMAN, *Primary Examiner.*

W. S. BRADBURY, *Assistant Examiner.*